Aug. 3, 1926.  1,594,689
R. D. PIKE
METHOD FOR CALCINING AND CLINKERING WITH RECOVERY OF BY-PRODUCT
HEAT AND BY-PRODUCTS
Filed July 1, 1924
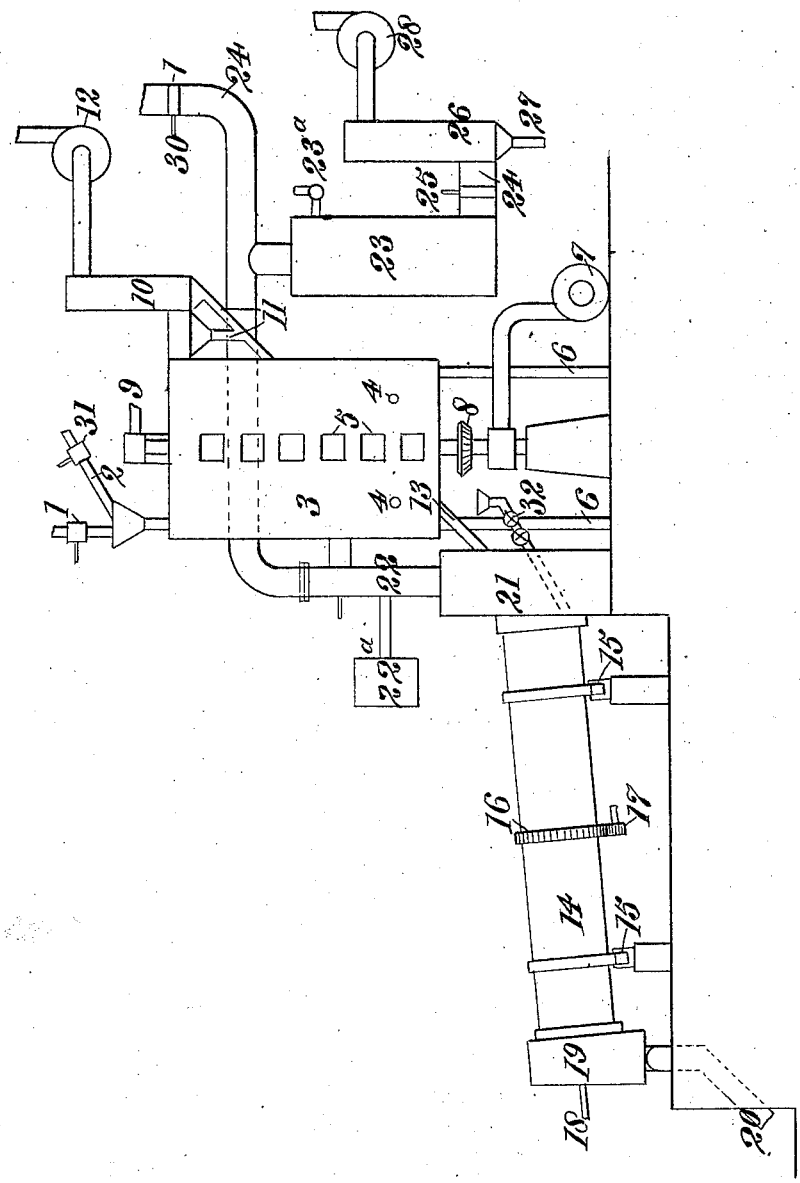
Inventor
Robert D Pike
By Harry H. Totten
Attorney.

Patented Aug. 3, 1926.

1,594,689

UNITED STATES PATENT OFFICE.

ROBERT D. PIKE, OF SAN MATEO, CALIFORNIA.

METHOD FOR CALCINING AND CLINKERING WITH RECOVERY OF BY-PRODUCT HEAT AND BY-PRODUCTS.

Application filed July 1, 1924. Serial No. 723,504.

My present invention relates to a modification of the method disclosed in my application for Letters Patent Serial Number 645,166, whereby the waste gases from the rotary kiln or clinkering element are taken away from the calciner and used for generating steam or for other useful purposes.

It is obvious that in the method disclosed in the above mentioned application that the reason for conducting the gases from the clinkering element into the calciner above the zone of combustion therein is to conserve their heat and to apply the same advantageously for heating and calcining the materials within the calciner.

But I have found that the amount of waste heat leaving the rotary kiln or clinkering element when using my method for making Portland cement clinker is relatively small when compared with the fuel consumed in the calciner and that whether or not the heat from this clinkering element is usefully employed in the calciner is not a determining factor in realizing the high fuel economy of my method covered by Serial Number 645,166.

The reason for this is that in burning Portland cement clinker the greater part of the heat is required for raising the raw materials to the calcining temperatures and then for effecting their calcination; and, in my method, when calcination is substantially complete, the hot calcined material is dropped into a clinkering element which is preferably a rotary kiln having a very small volume compared with the volume of the calciner, and a small hot flame quickly makes the clinker with a small expenditure of fuel. The making of the clinker is further assisted and the amount of fuel reduced by the liberation of heat from the formation of calcium, aluminum and ferrous silicates of which the clinker is mainly composed and which heat is advantageously utilized in a small volume. The waste gases leaving the clinkering element are relatively high in temperature but small in quantity and what relatively small amount of heat they contain is in highly available form for efficiently assisting in calcination.

On the other hand, I have found it advantageous under certain conditions to pass the waste gases from the clinkering element away from the calcining element and to utilize them in other ways. The principal advantages are described in the following.

When the raw mix for Portland cement manufacture contains pyrite ($FeS_2$) this compound must be oxidized to $SO_2$ and $Fe_2O_3$ because otherwise an injurious amount of sulphur will remain in the clinker. In ordinary practice in making Portland cement clinker in rotary kilns, this is accomplished by admitting a considerable surplus of air over that required for combustion, thereby increasing fuel consumption. The $SO_2$ and $SO_3$ in combination with $O_2$, $CaO$, $K_2O$ and $Na_2O$ combine to form $CaSO_4$, and alkali-metal sulphate and these compounds unite at a red heat with the dust to form sticky deposits high in $SO_3$ and alkali which adhere to the brickwork and cause trouble.

In my method I can maintain a substantially neutral atmosphere in the calciner, thereby reducing the oxidation of sulphur and causing some of it to pass on to the clinkering element, and at the same time effecting fuel economy in calcination. In the clinkering zone, an oxidizing atmosphere can be maintained which will oxidize the remaining sulphur to $SO_3$ and $SO_2$; at the same time the high temperature existing in the clinkering element volatilizes most of the $K_2O$ and $Na_2O$. Thus a considerable portion of the sulphur and practically all of the alkali can be isolated in the waste gases from the rotary kiln and if these gases are not passed into the calciner these compounds will not be present to form sticky deposits on the brickwork within the calciner.

I am aware that it has been proposed formerly to take the gases direct from the clinkering stage and to recover potash therefrom by electrical precipitation. But my present invention for so controlling the atmosphere of the respective stages of calcining and clinkering so that the oxygen concentration in the calcining zone is less than in the clinkering zone, resulting in most of the $SO_2$ and $SO_3$ being associated with the alkali-metal fumes in the gases from the clinkering zone, and in fuel economy, is new in the art.

Such association is also of vital necessity because by my method so little fuel is burned in the clinkering element that the sulphur usually contained in the fuel will not be sufficient to satisfy the alkalies; but by increasing the sulphur content in the clinkering zone, sufficient $SO_2$ will be formed to fix all of the alkali as sulphate. It is furthermore contemplated that if insufficient sulphur for fixing the alkalies occurs naturally in the raw mix for Portland cement manufacture that an additional quantity may be added. This may be accomplished by adding the small requisite quantity in the form of pyrite or pyrrholite to the raw mix entering the calciner, to the hot calcined mix entering the clinkering element, or the sulphur may be converted in an outside burner of usual type to $SO_2$ with some $SO_3$ and this gas caused to mingle with the waste gas from the clinkering element. It is thus seen that by my method I cause the waste gases leaving the clinkering element to contain practically all of the alkali originally contained in the raw mix together with an adequate amount of $SO_2$, $O_2$ and $SO_3$ for making the compounds $K_2SO_4$ and $Na_2SO_4$.

The waste gases issuing from the clinkering element are relatively hot (about 2000 degrees F.) and must be cooled before they can be treated by electrical precipitation or other suitable means for the recovery of their contained $K_2SO_4$ and $Na_2SO_4$; at the same time it is desirable to recover the heat which they contain in some useful form. I therefore cause these gases to pass through a waste heat boiler of any desired form but preferably of the fire tube type which can be easily cleaned. This will reduce their temperature to about 800 degrees F. If desired, the temperature can be further reduced by humidifying with water sprays to about 250 degrees F., and the $K_2SO_4$ and $Na_2SO_4$ are then preferably recovered as substantially pure salts by passing through an electrical precipitator.

In the accompanying drawing I present for illustration and not for limitation a means for carrying out my inventiton.

The figure is a side elevation of an apparatus for making Portland cement clinker, steam from waste heat, and substantially pure alkali-metal sulphates.

1 illustrates a conveyor for the raw mix, 2 is a feed box into which the conveyor discharges, and 3 is a calciner of the multiple hearth mechanically rabbled type provided with the burners 4 for liquid, gaseous, or pulverized fuel. The calciner is equipped with the usual working doors 5, supports 6, an air blower 7, gear mechanism 8 for rotating the rabbling mechanism and outlet 9 for cooling air from the rabbling mechanism. 10 is an electrical precipitator connected by pipe 10' with the upper end of calciner 3 and 11 are pipes for returning precipitated dust to the calciner, and air exhauster 12 removes gases of combustion and calcination from the calciner.

The hot calcined material drops through spout 13 into rotary kiln 14 which is inclined and rotates in the cradles 15, in the usual manner; rotation being imparted to the girth gear 16, through the pinion 17, from drive, not shown. Liquid, gaseous or pulverized fuel is introduced by burner 18 into the usual firing hood 19. The clinker drops through chute 20 from the kiln to any suitable place of storage. The gases of combustion from the rotary kiln 14 pass into a chamber 21 and then through a pipe 22 into and through the waste heat boiler 23, then through humidifying chamber 24, into which water is supplied by water pipes 25, and into the electrical or other precipitator 26 of any well known type. The alkali sulphate salts leave the system through a pipe 27 and the gases are exhausted by the exhauster 28. An auxiliary stack 29 is provided with damper 30, which is closed under normal operating conditions. The sulphur burner for burning sulphur to provide $SO_2$ with some $SO_3$ is indicated at 22$^a$ and connects with waste heat pipe 22 through which passes the hot gases from calciner 14.

To enable the addition of the small requisite quantity of sulphur in the form of pyrite or pyrrholite to the raw mix entering the calciner 3 through feed box 2, I provide a conventional feed conveyor 31, and if the pyrite or pyrrholite is to be added to the hot calcined mix on its entering the clinkering element, it may be supplied through gate controlled hopper 32.

I claim:—

1. The method of calcining and clinkering and recovering by-products which consists in passing the material for treatment through a calcining zone, thence passing into a separate clinkering zone, introducing sulphur into the clinkering zone, oxidizing a portion of the same therein and effecting removal from the gases leaving the clinkering zone of their contained alkali metal compounds.

2. The method of calcining and clinkering and recovering by-products which consists in passing the material for treatment through a calcining zone, thence passing into a separate clinkering zone, mixing gases containing sulphur with the gases issuing from the clinkering zone and effecting removal from the mixed gases of their contained alkalies.

3. The method of calcining and clinkering which consists in passing the material for treatment containing sulphur through a calcining zone in association with gases containing an insufficient amount of oxygen for oxidizing all of the sulphur, thence passing the material into a separate clinkering zone and causing substantially all of the remaining oxidizable sulphur to be therein oxidized.

4. The method of calcining and clinkering which consists in passing the material for treatment containing sulphur through a calcining zone in association with gases containing an insufficient amount of oxygen for oxidizing all of the sulphur, thence passing the material into a separate clinkering zone and causing substantially all of the remaining oxidizable sulphur to be therein oxidized, and effecting removal from the gases issuing from the clinkering zone of their contained alkalies.

5. The method of calcining and clinkering which consists in passing the material for treatment through a calcining zone in the presence of a substantially neutral or oxygen free heating atmosphere, thence passing the calcined material into a clinkering zone in the presence of an oxidizing heating atmosphere.

6. The method of calcining and clinkering which consists in passing the material for treatment through a calcining zone and thence into a clinkering zone and maintaining separate heating atmospheres in the respective zones, that in the calcining zone having a lesser oxygen concentration than that in the clinkering zone.

In testimony whereof I have signed my name to this specification.

ROBERT D. PIKE.